United States Patent Office 2,717,838
Patented Sept. 13, 1955

2,717,838

STABILIZED TALL OIL ROSIN AND DRY SIZES PREPARED THEREFROM

Justus C. Barthel and Randall Hastings, Stamford, Conn., assignors to American Cyanamid Company, New York, N. Y., a corporation of Maine No Drawing. Application July 11, 1951,
Serial No. 236,272

6 Claims. (Cl. 106—218)

This invention relates to stabilization of tall oil rosin and to the production therefrom of dry rosin size compositions of increased storage stability. The invention includes the stabilized tall oil rosins themselves and their methods of preparation as well as size compositions and methods of preparing the same.

Tall oil rosin is now a recognized article of commerce for which a definite standard has been established by the U. S. Department of Agriculture. It is defined as rosin remaining after the removal of the fatty acids from tall oil by fractional distillation. The product has the characteristic form and appearance and other physical and chemical properties normal for other kinds of rosin, but is more highly purified. Because the original resins of the pine wood have been extracted by the paper pulp digester liquor and have been further refined by subsequent distillation, tall oil rosin contains little or none of the natural antioxidants that have assisted in stabilizing ordinary wood and gum rosins. For this reason its stabilization has presented a definite problem.

It is a principal object of the present invention to provide a stabilized tall oil rosin; i. e., one possessing a more stable chemical constitution than ordinary tall oil rosin, this increased stability being shown by the increased storage stability of alkali metal soaps or sizes prepared therefrom. It is a further object of the invention to provide storage-stable dry sizes prepared from stabilized tall oil rosin. A still further object is the provision of tall oil rosin compositions which do not crystallize upon storage in molten or liquid condition, and which therefore can be shipped in tank cars and stored in hot storage tanks without excessive crystal development.

We have found that tall oil rosin can be stabilized to the extent necessary to accomplish the principal object outlined above by disproportionation to a certain minimum specific rotation after adding a disproportionating stabilizer thereto. We have discovered, as a principal feature of our invention, that tall oil rosin so disproportionated can be rendered stable by the incorporation therein of known dry rosin size antioxidants; i. e., compounds known to be effective antioxidants for dry sizes prepared from ordinary wood rosin or gum rosin. Such known antioxidants are, for example, the secondary diarylamines and related compounds described in Dreshfield Patent No. 2,294,723, the phenothiazine described in Barthel et al., Patent No. 2,471,714, and similar antioxidants such as nitrosodiphenylamine, di-tert.-butyl paracresol and the like. These organic chemical antioxidants are of course well known to those skilled in the art.

The disproportionating stabilizers that we employ are so designated because they possess both the property of accelerating the disproportionation of tall oil rosin and the property of stabilizing it. Typical substances possessing this combination are elemental sulfur or selenium and salts with strong bases of non-oxidizing oxyacids of sulfur; i. e., those in which the valency of the sulfur is less than 6 and which therefore have a lower oxygen-to-sulfur ratio than in sulfuric acid. Salts of the following types are representative, the sodium salt being listed by way of example.

| Class Name | Salt |
|---|---|
| Sulfite | $Na_2SO_3$; $NaHSO_3$. |
| Metabisulfite | $Na_2S_2O_5$. |
| Hyposulfite | $Na_2S_2O_4$. |
| Thiosulfate | $Na_2S_2O_3$. |
| Polythionates | $Na_2S_xO_6$, Where $x=2-5$. |

Any of the alkali metal or ammonium salts of the non-oxidizing oxy-acids of sulfur may be used in practicing the invention; however, the sodium salts are preferred because of their cheapness and availability. It will be understood that mixtures of any two or more of the compounds may be employed, or that mixtures of materials which produce these salts under the conditions of heat-treatment may be used.

The quantity of sulfur or of sulfur oxyacid salt to be employed as disproportionating stabilizer in practicing the invention can be varied from about 0.5% to about 5% by weight, based on the weight of the tall oil rosin. Within this range the quantities, which are hereinafter referred to as stabilizing quantities, are dependent upon the heat treatment to be used and upon the degree of stabilization desired in the finished tall oil rosin or in dry rosin sizes prepared therefrom. The quantity of disproportionating stabilizer will also depend somewhat on the amount and kind of chemical antioxidant employed; thus when quantities of 0.1% to 0.5% of phenothiazine are used the amount of sulfur may be varied from about 0.5% to about 2.5%, whereas with the same amounts of phenothiazine it is advisable to employ from about 1% to about 3.5% of sodium sulfite or other sulfur-acid salt. On the other hand, when corresponding quantities of diphenylamine or other secondary diarylamine are used it is advisable to employ larger amounts of sulfur or of sulfur-acid salt such as those within the range of about 1–3% of sulfur or 2–5% of sodium sulfite or the like.

In general, any suitable heat treatment may be employed that will increase the specific rotation of the tall oil rosin from its normal value of about zero (plus or minus a few degrees) to a minimum value of about 25 or slightly less. Good results have been obtained by heating the tall oil rosin to temperatures of 250–325° C. for times of from 10 minutes to 2 hours; however, the exact temperature and time of heating can easily be regulated by following the optical rotation of the rosin. It is an important advantage of our invention that the sulfur and alkali metal and ammonium salts of non-oxidizing oxyacids of sulfur, which are our preferred disproportionating stabilizers, accelerate the increase in specific rotation of the tall oil rosin during the heat treatment, so that only relatively short heating times are usually necessary.

The secondary diarylamine, phenothiazine or other known dry rosin size antioxidant, which we designate as the organic chemical antioxidant, may be added to the tall oil rosin in amounts of 0.1% to 1% by weight either before or after the heat treatment. We prefer, however, to incorporate it into the tall oil rosin before or during the heat treatment thereof; preferably it is added along with the disproportionating antioxidant. Our preferred operating procedure is that described in the following examples, wherein the tall oil rosin is melted and heated to about 160° C., the disproportionating antioxidant and the organic chemical antioxidant are added, and the rosin is then heated to about 275–300° C. and maintained at this temperature for about 15–30 minutes and then allowed to cool.

Dry sizes may be made from our stabilized tall oil rosin by any known or approved method. Liquid rosin sizes are ordinarily made by heating rosin with an aqueous solution of sodium or potassium carbonate, using about 9–16% of sodium carbonate or 12–21% of potassium carbonate based on the rosin and sufficient water (which may be added in portions during the saponification) to form a liquid size solution of about 70% solids. The saponification is ordinarily carried out at about 190°–212° F. during about 6 hours. Liquid rosin sizes may be prepared from our stabilized tall oil rosins by this procedure and converted into dry sizes by drum-drying or spray-drying. Dry sizes may also be prepared by reacting our stabilized tall oil rosins with about 9–12% of sodium or 13–17% of potassium hydroxide in the form of concentrated aqueous solutions, whereby a dry composition of the low moisture content can be produced directly.

From the foregoing it will be seen that our invention, in its broadest aspects, is directed to the combined steps of disproportionating tall oil rosin to a minimum specific rotation of about +25° after adding stabilizing amounts of a disproportionating stabilizer, which is preferably sulfur or a salt of a non-oxidizing acid of sulfur with a strong base, and completing the stabilization by incorporating further stabilizing amounts of an organic chemical antioxidant therein. The necessity for this combined treatment arises from the fact, which we discovered, that unmodified tall oil rosin cannot be completely stabilized by the addition of any one stabilizer. Thus, for example, we added phenothiazine to ordinary tall oil rosin and subjected it to the heat treatment described in Example 1 and then converted the heat-treated and supposedly stabilized rosin into dry rosin size by reaction with aqueous sodium carbonate solution and subsequent drum drying. The resulting size, however, upon storage in paper bags, increased in temperature, became dark in color, and finally smoldered and was totally unfit for use in sizing paper. Similar tests made with such disproportionating stabilizers as sulfur and sodium sulfite gave similar results; i. e., neither of these materials protected the tall oil rosin to the extent necessary to produce oxidation-resistant dry size therefrom. Complete storage stability of the tall oil rosin size was obtained, however, by the combined treatment of the present invention, as is hereinafter demonstrated by detailed experimental results.

The invention will be further illustrated by the following specific examples. It will be understood, however, that although these examples may describe certain specific features of the invention in detail, they are given primarily for illustrative purposes and the broad principles of the invention are limited only by the scope of the appended claims.

EXAMPLE 1

Dry sizes were prepared from a commercial tall oil rosin obtained by the vacuum steam distillation and fractionation of tall oil. This rosin had an acid number of 160, a color of M, a hardness of 0.5, a softening point of 70° C., a specific rotation of approximately zero, and a rosin acids content of 86%.

Batches of this rosin weighing 1 kilogram were heated to 160° C. and the desired amounts of sulfur and of phenothiazine were added and distributed uniformly. The samples were then heated to 300° C. during a period of about 1 hour with sufficient agitation to ensure that all sulfur had dissolved in the rosin. The batches were held at 300° C. for 15 minutes and then allowed to cool. During the entire heat-treating procedure small streams of carbon dioxide were bubbled through the samples to exclude atmospheric oxygen. The resulting products were light-colored, stable, partially disproportionated rosins having the specific rotations shown in Table I.

After cooling to about 150° C. the rosin samples were reacted at about 100° C. with 13% of their weight of sodium carbonate dissolved in sufficient water to make rosin size solutions of 70% solids content. The resulting liquid sizes were drum dried to a moisture content within the range of 1–3% on a polished drum heated with steam under 75 lbs. gage pressure.

Samples of the sizes so prepared were tested for oxidation resistance by an oxygen bomb test. This test is carried out by placing a sample in an atmosphere of commercially pure oxygen under 50 lbs. per square inch gage pressure maintained at 70° C. for 48 hours. The oxidation is then measured by a standard foam test, which is as follows:

To 180 ml. of demineralized water in the cup of a Hamilton Beach Drink Mixer there is added 20 ml. of a 5% solution of the size under test. A 5 ml. portion of a 10% aqueous solution of papermakers alum is then added and the mixture is agitated for 1 minute. The total volume is immediately measured in a 500 ml. graduate. The percent foam is calculated by the formula:

$$\text{Percent foam} = \frac{\text{total volume (foam+solution)} - \text{solution volume}}{\text{solution volume}} \times 100$$

The quantities of sulfur and of phenothiazine added to the samples of tall oil rosin and the foam test results obtained are given in Table I.

Table I

| Sample No. | Specific Rotation, Degrees | Percent Sulfur Added | Percent Phenothiazine Added | Percent Foam |
|---|---|---|---|---|
| 1 | +22.0 | None | 0.25 | 68.2 |
| 2 | +42.7 | 2.0 | None | 48.8 |
| 3 | +36.5 | 1.0 | 0.125 | 17.1 |
| 4 | +42.8 | 1.5 | 0.125 | 14.6 |
| 5 | +45.6 | 2.0 | 0.125 | 7.32 |
| 6 | +39.2 | 1.0 | 0.25 | 9.75 |
| 7 | +45.5 | 1.5 | 0.25 | 9.75 |
| 8 | +48.3 | 2.0 | 0.25 | 9.75 |

EXAMPLE 2

Following the procedure described in Example 1, batches of the same tall oil rosin were treated with varying amounts of representative salts of non-oxidizing oxyacids of sulfur having a lower oxygen to sulfur ratio than in sulfuric acid. Experience has shown that the salts of these acids with strong bases, and particularly the alkali metal and ammonium salts, will cooperate with small proportions of organic nitrogen-containing antioxidants such as phenothiazine, diphenylamine and the like to stabilize tall oil rosin and to impart storage stability to dry sizes made therefrom.

Samples of the tall oil rosin were melted and the desired quantities of sodium sulfite, sodium thiosulfate and sodium metabisulfite were added at 160° C. along with 0.25% of phenothiazine in those cases where this antioxidant was used. The rosin samples were then heated to 300° C. and maintained at this temperature for a 15-minute period, after which they were cooled to about 150° C. and made into 70% aqueous rosin size solutions with sodium carbonate by the procedure previously described. These size solutions were dried to a moisture content of 1–3% on a polished drum heated with steam under 75 lbs. p. s. i. gage pressure. It was noted that these samples could be drum dried at a rate about 20–30% faster than corresponding samples prepared from the same materials but containing no sodium sulfite or other salt of sulfur oxyacid.

Some of the samples were subjected immediately to the oxygen bomb test described in Example 1. Other samples were first heated in an oven, with access of air, for 18 hours at 110° C. and were then given an accelerated aging for 48 hours in the oxygen bomb. In Table II the foam test results on these samples are indicated by an asterisk.

All the samples were tested for oxidation by the standard foam test described in Example 1. The test results, together with the specific rotation of the heat-treated tall oil rosins, are given in Table II.

*Table II*

| Sample No. | Specific Rotation, Degrees | Sulfur-Acid Salt Added | Percent Phenothiazine Added | Percent Foam |
|---|---|---|---|---|
| 1 | +36.1 | 2.5% Na₂SO₃ | 0.25 | 7.3 |
| 2 | +27.1 | 2.5% Na₂S₂O₅ | 0.25 | 9.8 |
| 3 | +39.4 | 2.5% Na₂S₂O₃ | 0.25 | *12.2 |
| 4 | +44.6 | 3.5% Na₂SO₃ | 0.25 | *14.6 |
| 5 | +36.0 | 2.5% Na₂SO₃ | None | *58.5 |
| 6 | +42.3 | 3.5% Na₂SO₃ | None | *53.6 |
| 7 | +53.7 | 4.5% Na₂SO₃ | None | *22.0 |

*Heated before the oxygen bomb test.

EXAMPLE 3

Tall oil rosin is subject to crystallization when maintained in molten condition, which interferes seriously with its transportation in tank cars. We find that this is also true of the sulfur-treated and the sulfur-phenothiazine-treated rosins described in Example 1; they are also subject to crystallization that interferes with tank car shipments. Surprisingly, however, the tall oil rosins of Example 2 that had been heat treated after adding sodium sulfite and other similar salts of non-oxidizing oxyacids of sulfur were immune to crystallization, and could be stored and shipped successfully in molten condition.

We have found, as another feature of our invention, that tall oil rosins heat-treated after adding sulfur and organic nitrogen-containing antioxidants such as phenothiazine, diphenylamine and the like can be treated to eliminate crystallization upon hot storage by adding small amounts of alkalis such as sodium hydroxide, potassium hydroxide, sodium carbonate, potassium carbonate and the like. Quantities on the order of about 1–2% of alkali metal hydroxides and 1.5–2.5% of alkali metal carbonates are effective. Additions of alkali for this purpose do not interfere with stabilization of the rosin by the sulfur and antioxidant treatment.

Samples of the tall oil rosin described in Example 1 were melted and 1.5% by weight of sodium hydroxide was added. The molten rosin was then treated with sulfur and phenothiazine and was heated as described in Example 1. Incubation tests on the heat-treated rosin showed that it was free from crystal formation.

Portions of the rosin samples were made into liquid size, drum dried, and subjected to the oxygen bomb test, as described in Example 1, with the following results:

*Table III*

| Sample No. | Specific Rotation, Degrees | Percent Sulfur Added | Percent Phenothiazine Added | Percent Foam |
|---|---|---|---|---|
| 1 | +33.4 | 1.0 | 0.25 | 9.75 |
| 2 | +35.9 | 1.5 | 0.25 | 12.2 |
| 3 | +32.7 | 1.0 | 0.125 | 4.9 |
| 4 | +36.8 | 1.5 | 0.125 | 2.4 |

EXAMPLE 4

Four samples of tall oil rosin were heated to 160° C. To one of these there was added 1.5% by weight of sulfur. To another, 0.25% of diphenylamine was added. The other two samples received, respectively, 1.5% of sulfur plus 0.25% of phenothiazine and 1.5% of sulfur plus 0.25% of diphenylamine. All four samples were then heated to 300° C. and maintained at this temperature for 15 minutes, cooled and converted into liquid size with sodium carbonate solution which was drum dried.

The four dry sizes were heated in an oven for 18 hours at 110° C. and then given an accelerated aging for 48 hours at 70° C. in the oxygen bomb and were subjected to the foam test. The test results were as follows:

| Sample | Materials Added | Percent Foam |
|---|---|---|
| 1 | 1.5% Sulfur | 31.7 |
| 2 | 0.25% Diphenylamine | 53.6 |
| 3 | 1.5% Sulfur+0.25% Phenothiazine | 7.3 |
| 4 | 1.5% Sulfur+0.25% Diphenylamine | 14.2 |

What we claim is:

1. A storage-stable dry rosin size consisting essentially of the dry saponification product of rosin remaining after the removal of the fatty acids from tall oil by fractional distillation stabilized by disproportionation to a minimum specific rotation of about +25 after incorporating about 0.5% to about 5% by weight of a member of the group consisting of sulfur and salts of non-oxidizing oxyacids of sulfur with strong bases therein, said rosin size also containing stabilizing amounts of an organic chemical rosin size antioxidant.

2. A storage-stable dry rosin size consisting essentially of the dry saponification product of rosin remaining after the removal of the fatty acids from tall oil by fractional distillation stabilized by disproportionation to a minimum specific rotation of about +25 after incorporating therein from 0.5% to 5% by weight of a member of the group consisting of sulfur and salts of non-oxidizing oxyacids of sulfur with strong bases, said rosin size also containing from 0.1% to 1%, based on the weight of the rosin, of a member of the group consisting of diarylamines and phenothiazine.

3. A storage-stable dry rosin size consisting essentially of the dry saponification product of rosin remaining after the removal of the fatty acids from tall oil by fractional distillation stabilized by disproportionation to a minimum specific rotation of about +25 after incorporating stabilizing quantities of an alkali metal sulfite therein, said rosin size also containing from 0.1% to 1%, based on the weight of the rosin, of a member of the group consisting of diarylamines and phenothiazine.

4. A storage-stable dry rosin size consisting essentially of the dry saponification product of rosin remaining after the removal of the fatty acids from tall oil by fractional distillation stabilized by disproportionation to a minimum specific rotation of about +25 after incorporating about 1% to 3.5% of sodium sulfite therein, said rosin size also containing from 0.1% to about 0.5% of phenothiazine.

5. A method of producing a storage-stable dry tall oil rosin size which comprises heating rosin remaining after the removal of the fatty acids from tall oil by fractional distillation at 250°–325° C. to a minimum specific rotation of about +25 during from 10 minutes to 2 hours after adding about 0.5 to 5% by weight of a member of the group consisting of sulfur and salts of non-oxidizing oxyacids of sulfur with strong bases thereto, adding about 0.1% to 1% of an organic chemical rosin size antioxidant and saponifying said rosin with an alkaline alkali metal compound and drying the product.

6. A method according to claim 5 in which the organic chemical rosin size antioxidant is a member of the group consisting of diarylamines and phenothiazine.

References Cited in the file of this patent

UNITED STATES PATENTS

| | | |
|---|---|---|
| 2,334,762 | Hasselstrom | Nov. 23, 1943 |
| 2,395,278 | Kalman | Feb. 19, 1946 |
| 2,471,714 | Barthel et al. | May 31, 1949 |
| 2,476,450 | Morris | July 19, 1949 |
| 2,497,882 | Hampton | Feb. 1, 1950 |
| 2,503,268 | Hasselstrom | Apr. 11, 1950 |